United States Patent
Krishnamurthy et al.

(10) Patent No.: US 9,168,859 B2
(45) Date of Patent: Oct. 27, 2015

(54) SYSTEM AND METHOD FOR DISPLAYING VISUAL FLIGHT REFERENCE POINTS

(71) Applicant: HONEYWELL INTERNATIONAL INC., Morristown, NJ (US)

(72) Inventors: Prithvi Krishnamurthy, Bangalore (IN); Nirupam Karmakar, Bangalore (IN); Anup Raje, Bangalore (IN); Ravi Kumar Harapanahalli, Bangalore (IN)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 166 days.

(21) Appl. No.: 13/775,762

(22) Filed: Feb. 25, 2013

(65) Prior Publication Data

US 2014/0240148 A1   Aug. 28, 2014

(51) Int. Cl.
| | |
|---|---|
| *B60Q 1/00* | (2006.01) |
| *B64D 45/00* | (2006.01) |
| *G01C 21/32* | (2006.01) |
| *G01C 21/36* | (2006.01) |
| *G01C 23/00* | (2006.01) |

(52) U.S. Cl.
CPC ...... *B60Q 1/00* (2013.01); *G01C 21/32* (2013.01); *G01C 21/36* (2013.01); *G01C 23/00* (2013.01)

(58) Field of Classification Search
CPC ...... G01C 23/00; B60Q 1/00; G06Q 30/0251; G06T 30/0251; G08G 5/0021; G01S 12/91; G05D 1/0206; G09B 19/167; Y02T 70/745; Y10T 33/01
See application file for complete search history.

(56) References Cited

U.S. PATENT DOCUMENTS

| | | | |
|---|---|---|---|
| 6,789,010 | B2 | 9/2004 | Walter |
| 7,774,107 | B2 | 8/2010 | Brown |
| 8,032,268 | B2 | 10/2011 | Burgin et al. |
| 8,175,761 | B2 | 5/2012 | Nichols et al. |
| 8,249,806 | B1 | 8/2012 | McCusker |
| 2003/0107499 | A1 | 6/2003 | Lepere et al. |
| 2008/0021636 | A1 | 1/2008 | Stavaeus et al. |
| 2008/0103642 | A1* | 5/2008 | Cox et al. ................... 701/3 |
| 2009/0248297 | A1* | 10/2009 | Feyersisen et al. ...... 701/206 |
| 2010/0090869 | A1 | 4/2010 | Wipplinger et al. |

(Continued)

FOREIGN PATENT DOCUMENTS

| | | |
|---|---|---|
| WO | 2005103624 A3 | 11/2005 |
| WO | 2011107956 A1 | 9/2011 |

OTHER PUBLICATIONS

Furst, S. et al.: "A Vision Based Navigation System for Autonomous Aircraft" Robotics and Autonomous Systems 28, Elsevier 1999, pp. 173-184.

(Continued)

*Primary Examiner* — Brian Zimmerman
*Assistant Examiner* — Cal Eustaquio
(74) *Attorney, Agent, or Firm* — Ingrassia Fisher & Lorenz, P.C.

(57) ABSTRACT

A system and method are provided for displaying visual flight reference points and their associated flight data. This is achieved by coupling a processor to a display system and configured the processor to generate symbology graphically representative of the VRPs and their associated flight data. The display system then renders the VRP symbology and the flight data symbology proximate to the VRP symbology. In addition, the processor is configured to alter the symbology of the VRPs depending on the estimates elapsed time for each of the VRPs to become visible to the aircraft.

9 Claims, 7 Drawing Sheets

(56) References Cited

U.S. PATENT DOCUMENTS

| | | |
|---|---|---|
| 2010/0145610 A1 | 6/2010 | Bacabara et al. |
| 2011/0072368 A1* | 3/2011 | Macfarlane et al. .......... 715/760 |
| 2011/0254707 A1 | 10/2011 | Landragin et al. |
| 2011/0313597 A1 | 12/2011 | Wilson et al. |
| 2012/0215388 A1 | 8/2012 | Pepitone et al. |
| 2012/0265376 A1 | 10/2012 | Fleiger-Holmes et al. |

OTHER PUBLICATIONS

EP Examination Report for Application No. 14153727.4, dated Jun. 20, 2014.

EP Search Report for Application No. 14153727.4, dated Jun. 6, 2014.

* cited by examiner

SYSTEM AND METHOD FOR DISPLAYING VISUAL FLIGHT REFERENCE POINTS

TECHNICAL FIELD

Embodiments of the subject matter described herein relate generally to avionics display systems. More particularly, embodiments of the subject matter described herein relate to a system and method for displaying visual flight reference points.

BACKGROUND

Avionics display systems have been deployed aboard aircraft to visually convey a considerable amount of flight information in an intuitive and readily comprehendible manner. In conventional avionics display systems, much of the information is visually expressed on cockpit displays, such as a multipurpose control display unit (MCDU). A pilot may use the MCDU during visual flight rules (VFR) flight in order to report to air traffic control (ATC) the location of the aircraft in relation to a visual reference point (VRP).

That is, during a VFR flight, VRPs are used extensively to travel from one point to another or even during approach and landing. For example, a pilot may be required to report the position of an aircraft to ATC, the distance from a particular VRP and/or when the pilot can see a particular VRP. In certain cases, a pilot may be asked to report time (e.g. a certain number of minutes) before and/or after passing a particular VRP. In other cases, a pilot may want to fly towards a particular VRP en route to the desired destination. In each of the above scenarios, the pilot may be required to be familiar with the location of the potential VRPs that ATC may inquire about and be able to select their location on the or MCDU. The pilot then uses the MCDU to generate the flight data requested by air traffic control. Thus, in addition to being familiar with the location of the potential VRPs, the pilot's workload is increased during flight.

To address these problems, the pilot may preprogram a flight plan with references to the known locations of VRPs within a visible range. However, this still requires the pilot to be familiar with the VRPs and their locations. In addition, the above problems are exacerbated when a VRP is under fading lights (e.g. dusk or night-time). For example, certain VRPs such as lakes and rivers may not be visible and therefore little value. This preprogramming of the flight plan with references to the VRPs further increases the preflight workload of the pilot. In addition, the VRPs may clutter the display distracting the pilot from visualizing other significant information such as weather, terrain, traffic, ADS-B IN information, and etc.

Although such systems represent improvements in avionics technology, further enhancements to cockpit displays to make them more intuitive and easier to use may be desirable. Thus, it would be desirable to provide a system and method for readily displaying and providing flight data (e.g. distance, bearing, arrival time, and etc.) associated with one or more VRPs to a pilot. It would be further desirable to differentiate between day-time and night-time VRPs. It would be still further desirable to alert a pilot when a VRP becomes visible by altering the color of the graphical representation of the VRP.

BRIEF SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

A method is provided for displaying visual reference point (VRP) data. The method comprises retrieving the data associated with the VRP from a processor, graphically rendering symbology representative of a VRP symbol on a display, and displaying the data proximate to the VRP symbol.

Also provided is a system for displaying visual reference point (VRP) data. The system comprises a display system coupled to a processor that is configured to (1) generate symbology graphically representative of the VRP, (2) generate symbology graphically representative of data, and (3) render on the display system the VRP symbology and the data symbology proximate to the VRP symbology.

Furthermore, a method for displaying visual reference point (VRP) data is provided. The method comprises retrieving flight data associated with at least one VRP within a predetermined range and differentiating between VRPs visible during the day and VRPs visible at night. The at least one VRP symbol is graphically rendered on a display, a VRP is selected and the flight data for the selected VRP is display proximate to the VRP.

DETAILED DESCRIPTION

The following detailed description is merely exemplary in nature and is not intended to limit the subject matter of the application and uses thereof. Furthermore, there is no intention to be bound by any theory presented in the preceding background or the following detailed description. Exemplary embodiments of the system and method may be used in various modes of transportation; for example, automobiles, trucks, ships, etc. In addition, presented herein for purposes of explication is a preferred embodiment an implementation in an aircraft. However, it should be appreciated that this explicated example embodiment is merely an example and a guide for implementing the novel system and method for displaying visual flight reference points. As such, the examples presented herein are intended as non-limiting.

Techniques and technologies may be described herein in terms of functional and/or logical block components and with reference to symbolic representations of operations, processing tasks, and functions that may be performed by various computing components or devices. It should be appreciated that any number of hardware, software, and/or firmware components configured to perform the specified functions may realize the various block components shown in the figures. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following description may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting.

For the sake of brevity, conventional techniques related to graphics and image processing, navigation, flight planning, aircraft controls, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Figure 1:
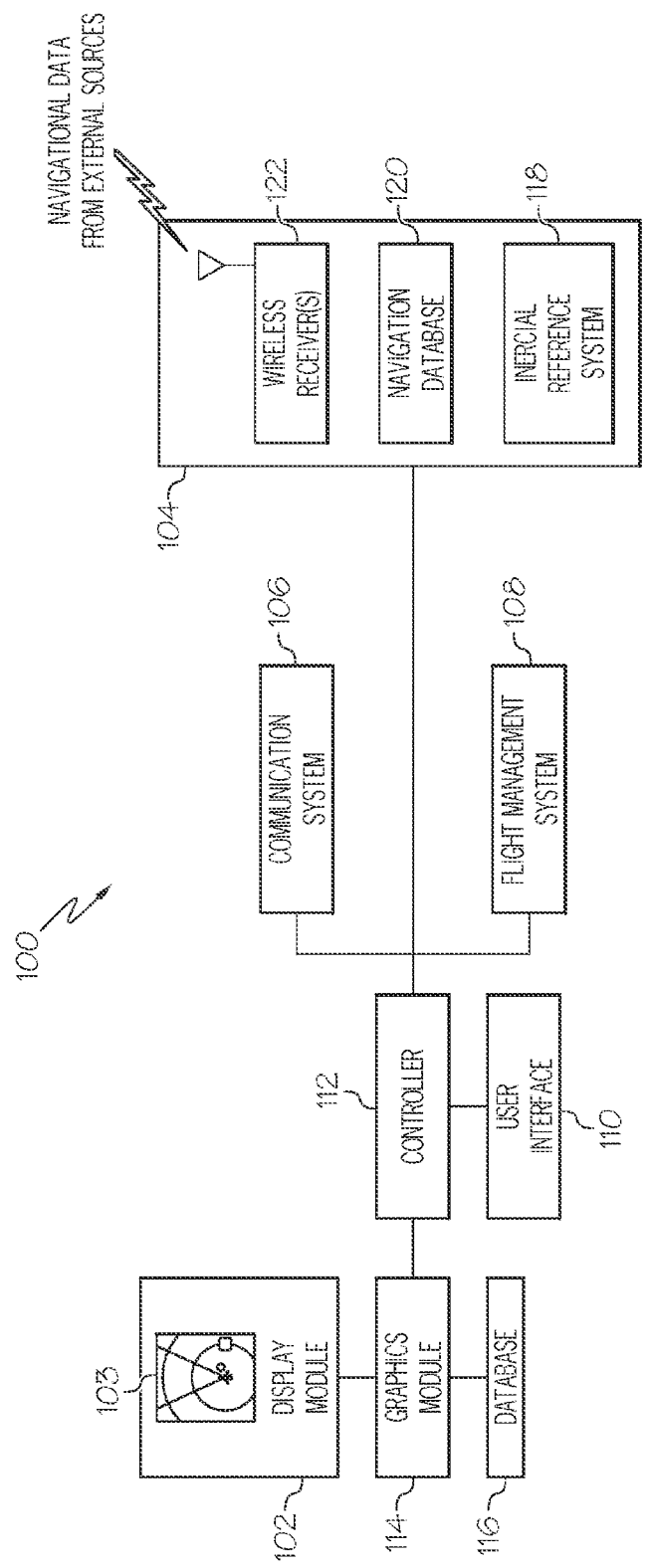
FIG. 1 is a block diagram of an information display system suitable for use in an aircraft in accordance with an embodiment.

FIG. 1 depicts an exemplary embodiment of an aircraft display system 100. In an exemplary embodiment, the display system 100 includes, without limitation, a display device 102 for displaying a graphical flight plan image 103, a navigation system 104, a communications system 106, a flight management system (FMS) 108, a controller 112, a graphics module 114, a user interface 110, and a database 116 suitably configured to support operation of the graphics module 114 and display device 102, as described in greater detail below. Navigation system 104 may include an inertial reference system 118, a navigation database 120 and one or more wireless receivers 122 for receiving navigational data from external sources in a well-known manner.

It should be understood that FIG. 1 is a simplified representation of a display system 100 for purposes of explanation and ease of description and is not intended to limit the application or scope of the subject matter in any way. In practice, the display system 100 and/or the aircraft will include numerous other devices and components for providing additional functions and features, as will be appreciated in the art. For example, the display system 100 and/or the aircraft may include one or more avionics systems (e.g., a weather system, an air traffic management system, a radar system, a traffic avoidance system) coupled to the flight management system 108 and/or the controller 112 for obtaining and/or providing real-time flight-related information that may be displayed on the display device 102.

In an exemplary embodiment, the display device 102 is coupled to the graphics module 114. The graphics module 114 is coupled to the processing architecture 112, and the processing architecture 112 and the graphics module 114 are cooperatively configured to display, render, or otherwise convey graphical representations or images of VRPs on the display device 102. As stated previously, navigational system 104 includes an inertial reference system 118, a navigation database 120, and at least one wireless receiver 122. Inertial reference system 118 and wireless receiver 122 provide controller 112 with navigational information derived from sources onboard and external to the host aircraft, respectively. More specifically, inertial reference system 118 provides controller 112 with information describing various flight parameters of the host aircraft (e.g., position, orientation, velocity, etc.) as monitored by a number of motion sensors (e.g., accelerometers, gyroscopes, etc.) deployed onboard the aircraft. By comparison, and as indicated in FIG. 1, wireless receiver 122 receives navigational information from various sources external to the aircraft. These sources may include various types of navigational aids (e.g., global position systems, non-directional radio beacons, very high frequency omni-directional radio range devices (VORs), etc.), ground-based navigational facilities (e.g., Air Traffic Control Centers, Terminal Radar Approach Control Facilities, Flight Service Stations, and control towers), and ground-based guidance systems (e.g., instrument landing systems). In certain instances, wireless receiver 122 may also periodically receive Automatic Dependent Surveillance-Broadcast (ADS-B) data from neighboring aircraft. In a specific implementation, wireless receiver 122 assumes the form of a multi-mode receiver (MMR) having global navigational satellite system capabilities.

Navigation database 120 includes various types of navigation-related data stored therein. In a preferred embodiment, navigation database 120 is an onboard database that is carried by the aircraft. The navigation-related data includes various flight plan related data such as, for example, and without limitation: locational data for geographical waypoints; distances between waypoints; track between waypoints; data related to different airports; navigational aids; obstructions; special use airspace; political boundaries; communication frequencies; and aircraft approach information. In an embodiment, the navigation database 120 stores VRP data which includes the geographical locations, size, surrounding terrain, and light dependent visibility associated with each VRP. The pilot may use the display system 100 to select a desired VRP and the flight data (e.g. distance, bearing, and flight time) for that VRP will be generated and displayed. In addition, the display system may be configured to automatically generate and display the flight data for the nearest left and right VRPs to the aircrafts location.

Controller 112 is coupled to the navigation system 104 for obtaining real-time navigational data and/or information regarding operation of the aircraft to support operation of the display system 100. In an exemplary embodiment, the communications system 106 is coupled to the controller 112 and configured to support communications to and/or from the aircraft, as is appreciated in the art. The controller 112 is also coupled to the flight management system 108, which in turn, may also be coupled to the navigation system 104 and the communications system 106 for providing real-time data and/or information regarding operation of the aircraft to the controller 112 to support operation of the aircraft. In an exemplary embodiment, the user interface 110 is coupled to the controller 112, and the user interface 110 and the controller 112 are cooperatively configured to allow a user to interact with display device 102 and other elements of display system 100, as described in greater detail below.

In an exemplary embodiment, the display device 102 is realized as an electronic display configured to graphically display flight information or other data associated with operation of the aircraft under control of the graphics module 114. In an exemplary embodiment, the display device 102 is located within a cockpit of the aircraft. It will be appreciated that although FIG. 1 shows a single display device 102, in practice, additional display devices may be present onboard the aircraft. In an exemplary embodiment, the user interface 110 is also located within the cockpit of the aircraft and adapted to allow a user (e.g., pilot, co-pilot, or crew member) to interact with the remainder of display system 100 and enables a user to select content displayed on the display device 102, as described in greater detail below. In various embodiments, the user interface 110 may be realized as a keypad, touchpad, keyboard, mouse, touchscreen, joystick, knob, microphone, or another suitable device adapted to receive input from a user. In preferred embodiments, user interface 110 may be a touchscreen, cursor control device, joystick, or the like.

In an exemplary embodiment, the navigation system 104 is configured to obtain one or more navigational parameters associated with operation of the aircraft. The navigation system 104 may be realized as a global positioning system (GPS), inertial reference system (IRS), or a radio-based navigation system (e.g., VHF Omni-directional radio range (VOR) or long range aid to navigation (LORAN)), and may include one or more navigational radios or other sensors suitably configured to support operation of the navigation system 104, as will be appreciated in the art. In an exemplary embodiment, the navigation system 104 is capable of obtaining and/or determining the instantaneous position of the aircraft, that is, the current location of the aircraft (e.g., the latitude and longitude) and the altitude or above ground level for the aircraft. The navigation system 104 may also obtain and/or determine the heading of the aircraft (i.e., the direction the aircraft is traveling in relative to some reference).

In an exemplary embodiment, the communications system 106 is suitably configured to support communications between the aircraft and another aircraft or ground location (e.g., air traffic control). In this regard, the communications system 106 may be realized using a radio communication system or another suitable data link system. In an exemplary embodiment, the flight management system 108 (or, alternatively, a flight management computer) is located onboard the aircraft. Although FIG. 1 is a simplified representation of display system 100, in practice, the flight management system 108 may be coupled to one or more additional modules or components as necessary to support navigation, flight planning, and other aircraft control functions in a conventional manner.

The controller 112 and/or graphics module 114 are configured in an exemplary embodiment to display and/or render information pertaining to VRPs on the display device 102 to allow a user (e.g., via user interface 110) to review various aspects (e.g., estimated flight time, rates of ascent/descent, flight levels and/or altitudes, and the like) of the flight plan. The controller 112 generally represents the hardware, software, and/or firmware components configured to facilitate the display and/or rendering of a navigational map on the display device 102 and perform additional tasks and/or functions described in greater detail below. Depending on the embodiment, the controller 112 may be implemented or realized with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. The controller 112 may also be implemented as a combination of computing devices, e.g., a combination of a digital signal processor and a microprocessor, a plurality of microprocessors, one or more microprocessors in conjunction with a digital signal processor core, or any other such configuration. In practice, the controller 112 includes processing logic that may be configured to carry out the functions, techniques, and processing tasks associated with the operation of the display system 100, as described in greater detail below. Furthermore, the steps of a method or algorithm described in connection with the embodiments disclosed herein may be embodied directly in hardware, in firmware, in a software module executed by the controller 112, or in any practical combination thereof.

The graphics module 114 generally represents the hardware, software, and/or firmware components configured to control the display and/or rendering of a navigational map on the display device 102 and perform additional tasks and/or functions described in greater detail below. In an exemplary embodiment, the graphics module 114 accesses one or more databases 116 suitably configured to support operations of the graphics module 114, as described below. In this regard, the database 116 may comprise a VRP database, terrain database, a weather database, a flight plan database, an obstacle database, a navigational database, a geopolitical database, a terminal airspace database, a special use airspace database, or other information for rendering and/or displaying content on the display device 102, as described below. It will be appreciated that although FIG. 1 shows a single database 116 for purposes of explanation and ease of description, in practice, numerous databases will likely be present in a practical embodiment of the display system 100.

Figure 2:
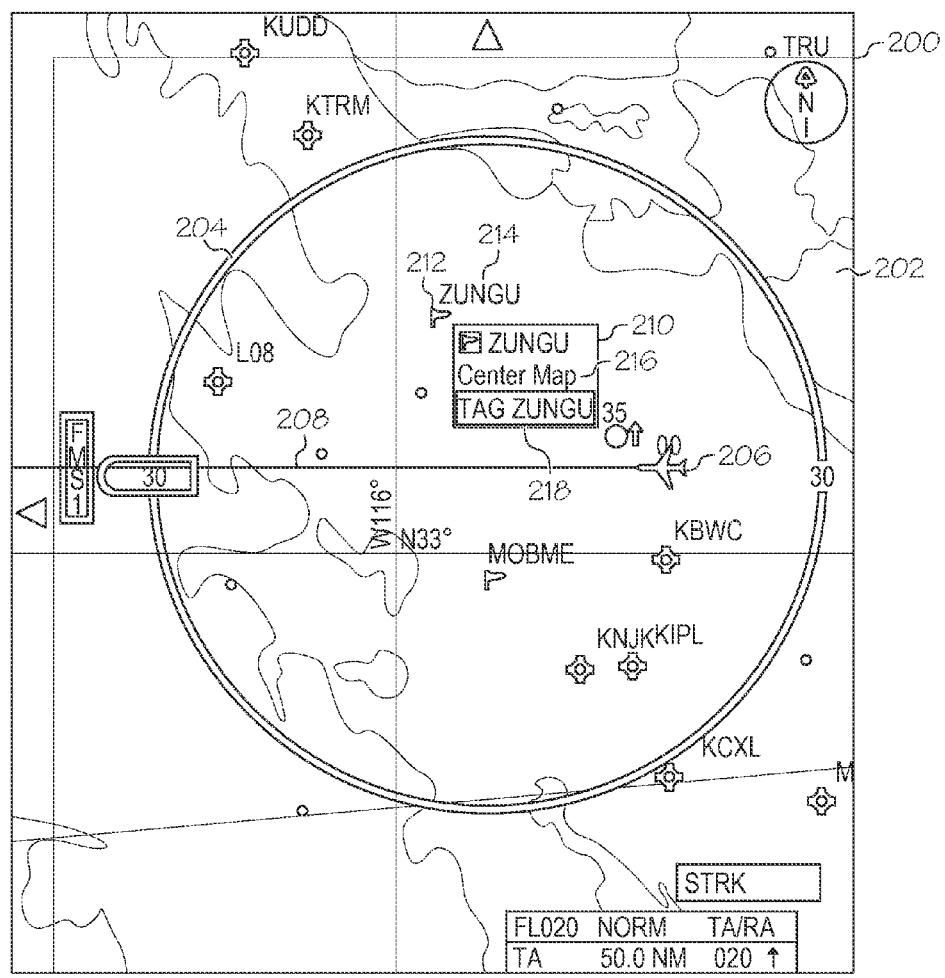
FIG. 2 illustrates a display comprised of a navigational map and a VRP overlay in accordance with an embodiment.
Figure 3:
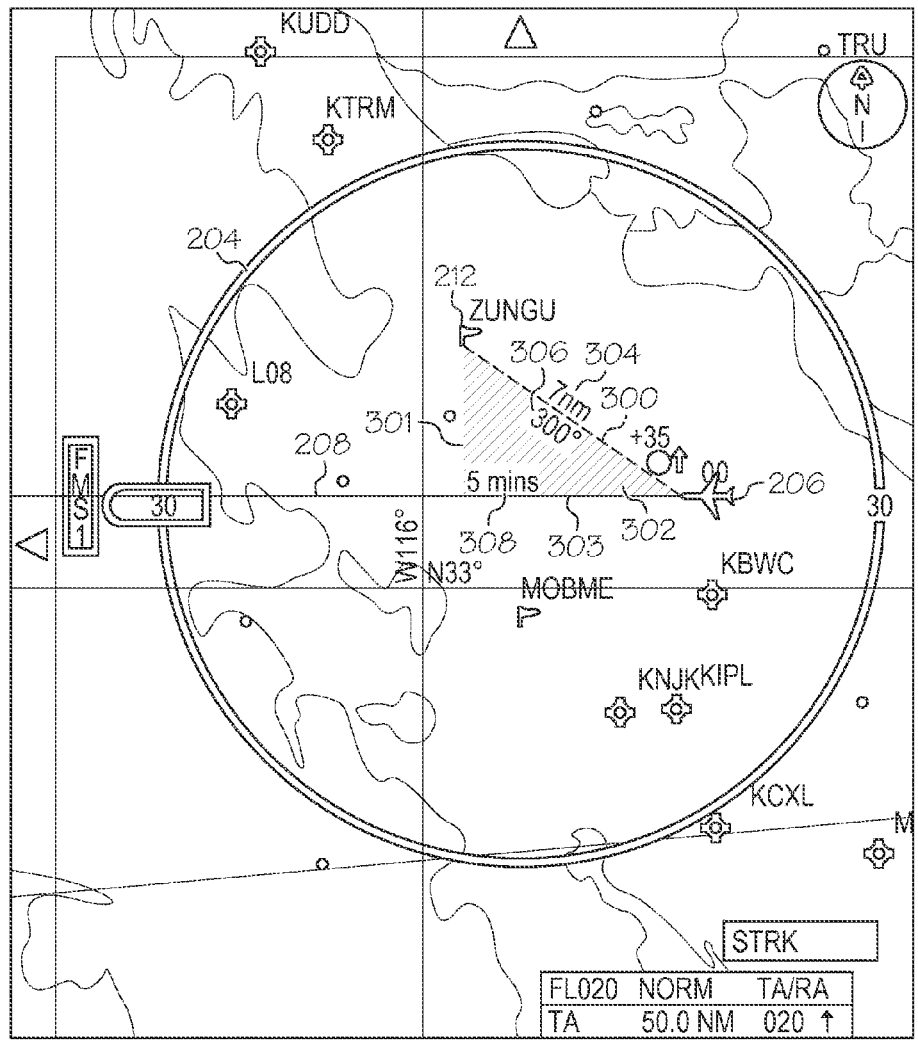
FIG. 3 illustrates a graphical display comprised of flight data associated with a selected visual reference point in accordance with an embodiment.

FIG. 2 illustrates a graphical representation of a navigational map 200 and a VRP overlay 202. The controller (112, FIG. 1) may be configured to render a navigational map 200 to display terrain, topology or other suitable items or points of interest within a given distance of the aircraft. The pilot may set the cutoff distance and the threshold distance. The cutoff distance is the viewable area and is set by the by zooming in to display a smaller geographic area or zooming out to display a larger geographic area. The relative scale of the area is shown by a range ring 204 having a number "30" thereon indicating thirty nautical miles. Meanwhile, the threshold distance is the outer most distance that flight data will be displayed for a VRP, in the condition that no VRP has been selected by the user. This distance may be set by the pilot or may be a predefined value set through experimentation. A graphical representation of a host aircraft 206 including its direction of flight 208 may also be rendered. The VRP overlay 202 may be programmed to automatically generate below a predefined altitude or the pilot may manually select the desired VRP overlay 202. This selection causes all VRPs to be overlaid or rendered within the viewable area of the navigational map 200. The pilot may select a VRP of interest by moving a cursor over the VRP and clicking on a non-touch screen interface or tapping the location of the VRP on a touch screen interface. This will cause the desired VRP to be selected and displayed in a menu box 210. The menu box 210 contains the name of the selected VRP (i.e. ZUNGU 214), the symbol 212 for the VRP, Center Map option 216, and TAG ZUNGU option 218. The pilot may choose the Center Map option 216, which centers the navigational map 200 over the selected VRP. The pilot may select the TAG option 218, which displays the data associated with the selected VRP as shown in FIG. 3. It should be appreciated that the menu box 210 may also contain additional functions or interactions with the VRP that are not described in connection to FIG. 2.

The data associated with VRP ZUNGU is shown in FIG. 3. The data or flight data may include the bearing, distance, and flight time from the current location of the host aircraft 206 to the selected VRP ZUNGU as illustrated in FIG. 3. For example, in response to selecting the TAG option for ZUNGU (218, FIG. 2) a line 300 is displayed from the current location of the host aircraft 206 to the VRP ZUNGU. A triangle 302 is formed having the line 300 between host aircraft 206 and VRP ZUNGU (represented by a symbol; e.g. a flag 212), a vertical line from VRP ZUNGU to a line representative of the direction of host aircraft 206 as its first leg 301, and a line 303 extending along the path of host aircraft 206 to first leg 301 as its second leg 303. A distance "7 NM" (seven nautical miles) 304 is shown proximate to line 300 as is a bearing indicating of "300°" (three-hundred degrees) 306. The estimated time it will take the aircraft to fly-by VRP ZUNGU is shown proximate to line 303 as indicated by "5 min" (five minutes) 308. In addition, the time it would take the aircraft to fly-over the VRP (i.e. the estimated time of arrival or ETA) may also be rendered proximate to line 300. It should be appreciated that distance, bearing and time data are generated to reduce the pilot's workload in knowing the location of the aircraft in relation to the VRPs and allow for quick and efficient reports to ATC. The default units for the distance, bearing and time may be altered to meet the design requirements or requirements of the pilot of ATC.

Figure 4:
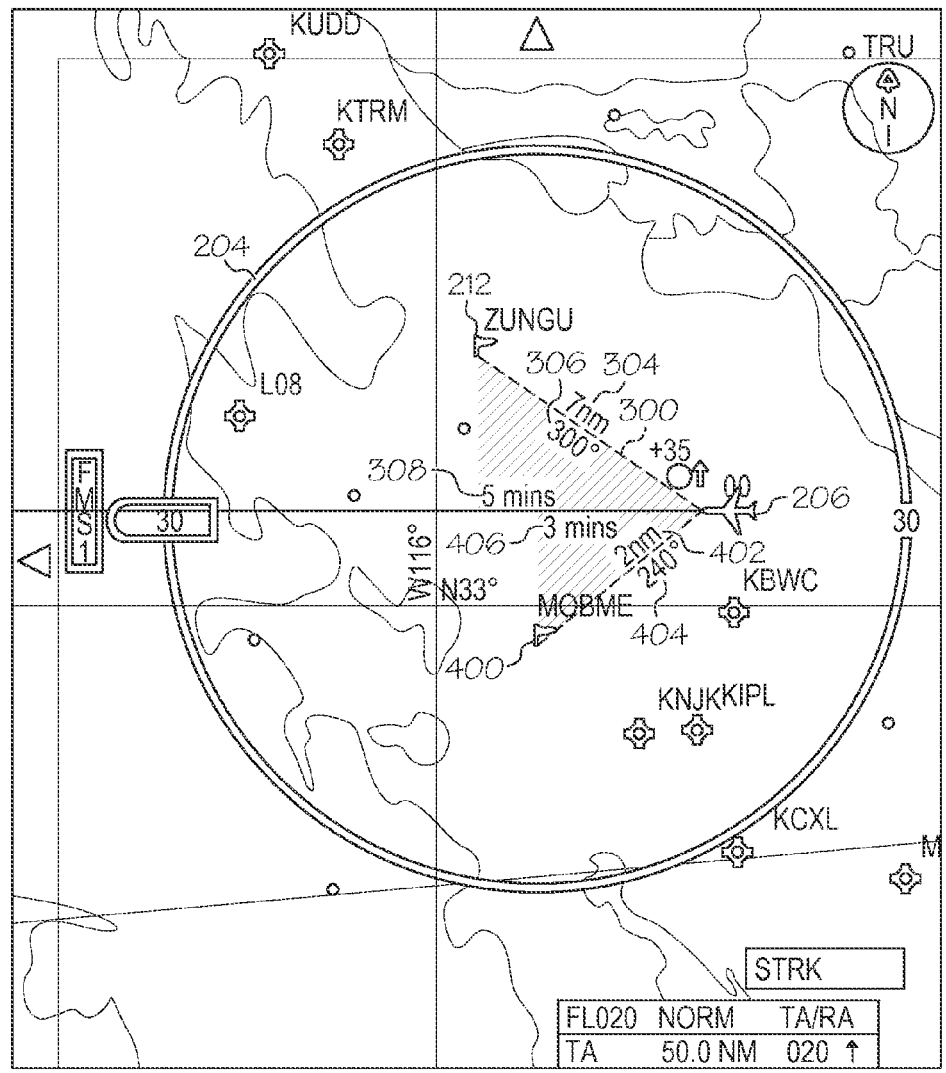
FIG. 4 illustrates a graphical display comprised of flight data for the nearest left and right visual reference points to an aircraft in accordance with an embodiment.

FIG. 4 illustrates a graphical representation of left and right VRPs with their associated flight data in accordance with an embodiment. If TAG ZUMBA option 218 is not selected as was the case in FIG. 2, a visual reference overlay is automatically generated selecting and visually representing the nearest left and nearest right VRPs with respect to host aircraft 206, as shown in FIG. 4. As can be seen, the nearest left VRP is MOSME representative by symbol (e.g. a flag) 400, and the nearest right VRP is ZUNGU representative once again by symbol (e.g. a flag.) 212. It should be appreciated that the number of VRPs for which flight data is automatically generated may be altered to meet the design requirements. The flight data that will be generated may be similar to flight data generated in response to the pilot tagging a VRP as shown in FIG. 3. As stated above, this may include the bearing, distance and flight time from the current location of the host aircraft 206 to the respective VRP. That is, returning to FIG. 4, a bearing of "300°" 306, a distance of "7 NM" 304, and flight time of "5 min" 308 are graphically displayed for visual reference point ZUNGU 212. In addition, a bearing of "240°" 404, a distance of "2 NM" 402, and flight time of "3 min" 406 are displayed for visual reference point MOSME 400. In addition, it should also be appreciated that the default units for the distance, bearing and time may be altered to meet the design requirements.

Figure 5:
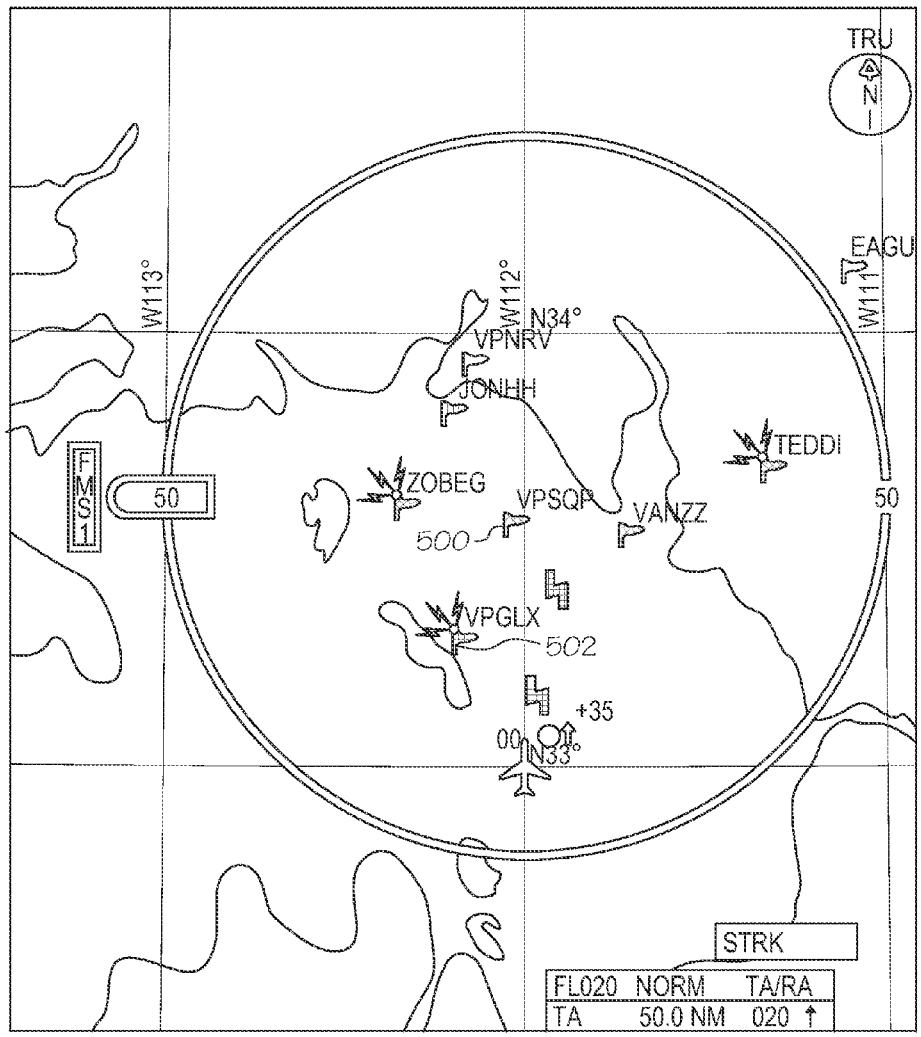
FIG. 5 illustrates a graphical display comprised of a plurality of day and night visual reference points in accordance with an embodiment.

FIG. 5 is a graphical representation of a plurality of daytime and night-time VRPs in accordance with a further embodiment. As stated previously, VRPs such as lakes and rivers are difficult to see in low light conditions (i.e. nighttime) making the VRP unusable to the pilot during these conditions. However, other VRPs such as lights on a building will become visible only during low light conditions. In accordance with the embodiment, the day-time VRPs are represented by a first symbol (e.g. flag), while the night-time VRPs are represented by a second symbol (e.g. a flag symbol with lightning bolts on top). For example, VPSQP 500 is a day time VRP and VPGLX 502 is a night time VRP. If desired, the pilot may choose to view only the day-time VRPs by deselecting the night-time VRP overlay and vice versa. This allows for the pilot to de-clutter the display, showing only relevant VRPs based on the time of day and available light.

In addition, VRPs may be graphically represented differently depending on the amount of time it will take for a VRP to become visible from the aircraft. This may be determined by the controller (112, FIG. 1) that analyzes various parameters associated with a given VRP such as distance from the host aircraft, size of the VRP, weather conditions, altitude of the host aircraft, etc. to determine when each VRP will become visible from the aircraft. For example, VRPs that will become visible within a first period of time, for example, the next ten minutes (e.g. VRP VPGLX 502) may be displayed in a first color (e.g. yellow), those that will become visible within a second period of time, for example, between ten minutes and thirty minutes (e.g. VRP VPSQP 500) may be represented by a second color (e.g. blue), and those that become visible in a third time period, for example, greater than thirty minutes (e.g. VRP VPNRV 504) may be represented by a third color (e.g. red). It should be appreciated that how the VRP's are distinguished on the display and the associated flight time ranges may be user selected or altered to meet various design requirements.

Figure 6:
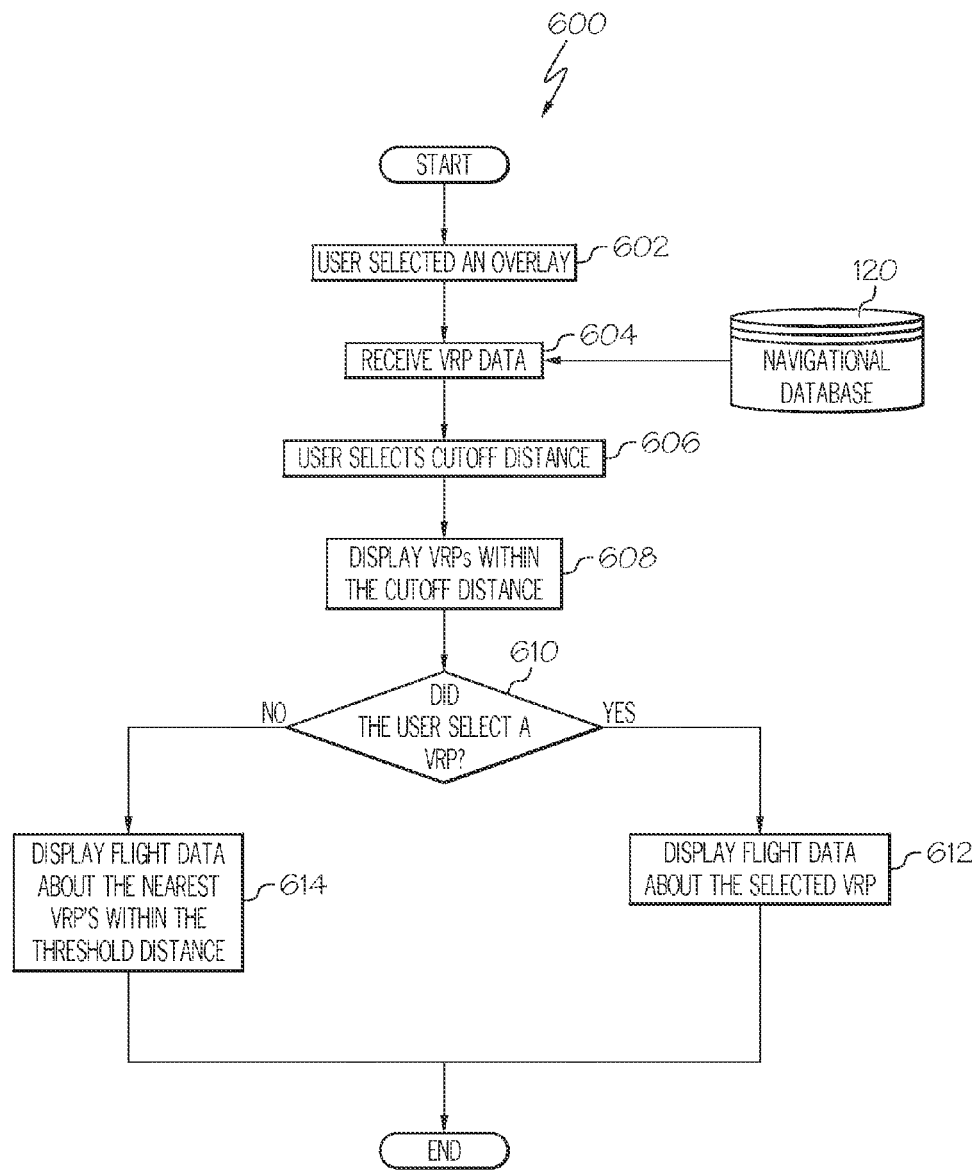
FIG. 6 is a flow chart for a displaying visual flight reference points in accordance with an embodiment.

FIG. 6 is a flow chart 600 describing a method for displaying VRPs in accordance with an embodiment. In STEP 602, a VRP overlay is selected. This may be a night-only overlay, a night and day overlay, or a day-only overlay. In STEP 604, VRP data associated with the selected overlay is received from navigational database 120. In STEP 606, a cutoff distance from the aircraft is selected and VRPs within the distance are displayed (STEP 608). The controller then determines if the VRP is a tagged VRP in STEP 610. If the VRP was tagged, flight data associated with the tagged VRP will be displayed as previously described (STEP 612) and the process ends. However, if the user did not tag a VRP, the controller will generate the flight data for the VRPs nearest to the left and or right of the aircraft within the threshold distance (STEP 614) and the process ends.

Figure 7:
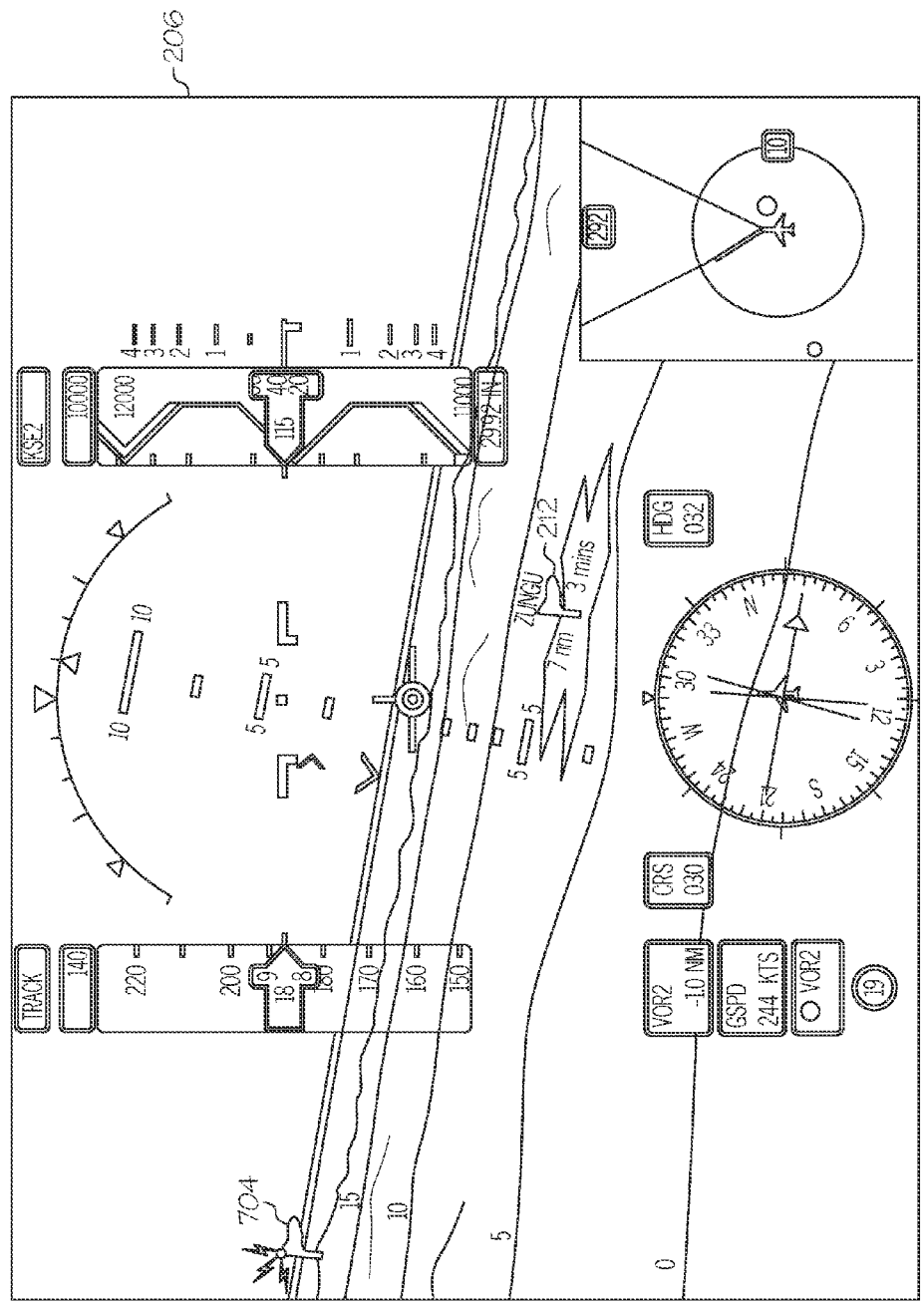
FIG. 7 is a graphical display illustrating a VRP on an Integrated Primary Flight Display (IPFD) or Smartview display.

FIGS. 2-5 generally depict top views (i.e. from above the aircraft). In practice, however, alternative embodiments may utilize various views such as perspective views, side views, angular or skewed views, and three dimensional views (e.g. of the type generated by a three-dimensional synthetic vision display. FIG. 7 illustrates such a three dimensional display graphically rendering host aircraft 206, a night-time VRP 704, and a tagged VRP 212 (ZUNGU) at seven nautical miles and an ETA of three minutes. Furthermore, in alternate embodiments, host aircraft 206 may be shown as traveling across the map as opposed to being located at a fixed location on the map. Thus, neither the type of display, nor the manner of graphical rendering limits the subject matter of the following claims in any way.

Thus, there has been provided a novel system and method for displaying visual flight reference points. This practical solution allows the pilot to either tag a VRP of interest or have a controller generate flight data for the VRPs nearest to the aircraft, reducing the workload of the pilot during visual flight rules flight. This method also allows the pilot to de-clutter the display by only showing VRPs of interest based on the time of day. In addition, to reducing the workload of the pilot before and during flight, this novel system and method enables the pilot to quickly and accurately report to ATC the distance, bearing, and flight time to a VRP.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method, execute by a processor, for displaying visual reference point (VRP) data on an aircraft display, the method comprising:
   retrieving data associated with a VRP from a database;
   processing the data associated with the VRP to generate:
   (i) a bearing of the aircraft relative to the VRP,
   (ii) a distance from the aircraft to the VRP, and
   (iii) an estimated time of arrival of the aircraft to the VRP;
   rendering a symbol graphically representative of the VRP on the display and;
   displaying on the display, proximate to the symbol for the VRP,
   (i) the bearing of the aircraft relative to the VRP,
   (ii) the distance from the aircraft to the VRP, and
   (iii) the estimated time of arrival of the aircraft to the VRP, and
   creating a region on the aircraft display that is bounded by the symbol for the aircraft, a VRP, a point where extending a perpendicular line from the VRP to the flight path intersects the flight path, and displaying the region in a visually distinguishable manner.

2. The method of claim 1, further comprising:
   receiving data associated with a plurality of VRPs from the processor; and
   differentiating the VRPs that are visible at day-time and the VRPs that are visible at night-time;
   representing, on the display, VRPs visible in day-time by a first symbol; and
   representing, on the display, VRPs visible in night-time by a second symbol.

3. The method of claim 2, further comprising deselecting a night-time visual reference overlay, thereby removing from the display the VRPs displayed as the second symbol.

4. The method of claim 2, further comprising deselecting a day-time visual reference overlay, thereby removing from the display the VRPs displayed as the first symbol.

5. The method of claim 1, further comprising tagging the VRP to retrieve (i) the bearing of the aircraft relative to the VRP, (ii) the distance from the aircraft to the VRP, and (iii) the aircraft's estimated time of arrival to the VRP.

6. The method of claim 1 further comprising:
   obtaining a threshold distance; and
   selecting, within the threshold distance, the nearest VRP to the left and the nearest VRP to the right of the aircraft.

7. A system for displaying data associated with a plurality of visual reference points (VRPs), comprising:
   a database of data associated with VRPs;
   a user interface for obtaining a tagged VRP;
   a display system; and
   a processor coupled to the database, the user interface, and the display system, the processor configured, in response to data associated with VRPs, to
   (1) differentiate between VRPs that are visible at night-time and the VRPs of the plurality of VRPs that are visible during the day-time;
   (2) represent, on the display system, VRPs visible during the day-time with a first symbol; and
   (3) represent, on the display system, VRPs visible at night-time with a second symbol;
   the processor further configured, in response to obtaining a tagged VRP, to display system to render, proximate to the tagged VRP symbol,
   (i) a bearing of the aircraft relative to the VRP,
   (ii) a distance from the aircraft to the VRP, and
   (iii) an estimated time of arrival of the aircraft to the VRP,
   wherein, responsive to the tagged VRP, the processor further:
   creates a region on the aircraft display that is bounded by the symbol for the aircraft, the tagged VRP, a point where extending a perpendicular line from the tagged VRP to the flight path intersects the flight path, and
   commands the display system to render the region in a visually distinguishable manner.

8. The system of claim 7, wherein the processor is further configured to (1) display only the visual reference points that are visible during the day-time in response to the deselection of a night time visual reference overlay; and (2) display only the visual reference points that are visible at night-time in response to the deselection of a day time visual reference overlay.

9. The system of claim 8 wherein the processor is further configured to alter the color of a VRP symbol in relation to the amount of time until the VRP is visible to the aircraft.

* * * * *